United States Patent [19]

Samad et al.

[11] Patent Number: 5,632,904
[45] Date of Patent: May 27, 1997

[54] WATER DISINFECTION METHOD USING METAL-LIGAND COMPLEXES

[75] Inventors: Nidal A. Samad, Palm Bay; Dwight D. Back, Melbourne, both of Fla.

[73] Assignee: Mainstream Engineering Corporation, Rockledge, Fla.

[21] Appl. No.: 417,988

[22] Filed: Apr. 6, 1995

[51] Int. Cl.⁶ .................................................... C02F 1/50
[52] U.S. Cl. ............................................................ 210/764
[58] Field of Search ............................................. 210/764

[56] References Cited

U.S. PATENT DOCUMENTS

| | | | |
|---|---|---|---|
| 2,734,028 | 2/1956 | Domogalla | 210/764 |
| 3,234,127 | 2/1966 | Teumac | 210/764 |
| 5,017,295 | 5/1991 | Antelman | 210/764 |
| 5,223,149 | 6/1993 | Antelman | 210/764 |
| 5,336,416 | 8/1994 | Antelman | 210/764 |
| 5,445,945 | 8/1995 | Drechsler | 210/764 |

FOREIGN PATENT DOCUMENTS

| | | | |
|---|---|---|---|
| 258792 | 10/1988 | Japan | 210/764 |
| 560835 | 12/1975 | U.S.S.R. | 210/764 |
| 791621 | 12/1980 | U.S.S.R. | 210/764 |
| 969679 | 10/1982 | U.S.S.R. | 210/764 |
| 971815 | 11/1982 | U.S.S.R. | 210/764 |
| 2197861 | 6/1988 | United Kingdom | 210/764 |

*Primary Examiner*—Neil McCarthy
*Attorney, Agent, or Firm*—Evenson, McKeown, Edwards & Lenahan, P.L.L.C.

[57] ABSTRACT

Metal-ligand complexes produced by coordination chemistry for use as a biocide and a method for detoxifying water or effluent are disclosed. Metallic biocides are bound with acceptable complexing agents as a type of coordination compound to shield the metal ions from other reactants in the water supply being treated while keeping the metal ions available for biocidal action. In particular, pre-mixed solutions of metal-ligand complexes are added as a disinfectant to water containing ions such as calcium, iron, carbonates, chlorides, nitrates, phosphates, and sulfates.

8 Claims, 10 Drawing Sheets

WATER DISINFECTION METHOD USING METAL-LIGAND COMPLEXES

BACKGROUND AND SUMMARY OF THE INVENTION

The present invention relates to a new use of metal-ligand complexes for water disinfection and a new method for producing disinfected water, i.e. water which does not contain infectious bacteria or transmit diseases to humans, for drinking and bathing by using know biocidal capabilities of low-concentration metallic species and chemical reactions of metallic species with binding agents to yield stable complexes unaffected by the chemistry of the water being treated for infectious bacteria.

Disinfected water is one of the most important necessities, if not the most important, for survival. The presence of disease-causing bacteria in natural water can render a water supply unusable, and is therefore a very important water quality parameter.

Disease-causing bacteria or pathogens are organisms capable of infecting or transmitting diseases to humans. Pathogens include species of bacteria, viruses, protozoa, and helminths. Cholera and Typhoid, for example, are transmitted by the bacteria *Vibrio cholera* and *Salmonella typhosa* respectively. Another common pathogenic bacteria in drinking water is *Escherichia coli*, or *E. coli*.

Current technologies utilize chlorine and ammonia, ozone, ultraviolet light, or hydrogen peroxide to treat non-potable water supplies. Application of these disinfection technologies can, however, yield toxic by-products, or require bulky systems or external power supplies.

Metallic ions (e.g. copper, silver, zinc, and nickel) are known biocides and have been used to treat lakes, and also as biofouling agents in paint and coatings. One complication in using these metals as biocides, however, is the affinity of the metal ions to react with naturally occurring anions present in fresh or natural water. Anions, such as carbonates, phosphates, sulfates, and chlorides form insoluble salts and can precipitate metallic cations out of solution, thereby eliminating the detoxification power of the biocidal metal. The major chemical species in natural fresh water are carbonate ($CO_3^{2-}$), iron ($Fe^{2+}$), and calcium ($Ca^{2+}$). Copper carbonate is insoluble in water, and hence, cupric ions react with carbonate ions and precipitate out of solution. Cations found in natural water, such as calcium and iron, can also limit the effectiveness of a particular complexing agent to bind with a more desired cation such as copper, zinc, or silver. The calcium and iron cations will form coordination bonds with ligands forming complexes, thereby displacing the desired biocide metal into solution and subsequently precipitate with naturally occurring anions in solution.

As used herein, a complex means an assembly of one or more central metal atoms such as $Cu^{2+}$, $Ag^{1+}$, $Ni^{2+}$, or $Zn^{2+}$, formed through coordination bonds with ligands and having a net neutral, positive, or negative charge. Ligand or complexing agent refers to atoms or groups of atoms, defined as coordinating atoms, which form coordination bonds to another atom, defined as the central or nuclear atom. Complexing agents, or ligands, can be monodentate, bidentate, tridentate, or tetradentate, for example, the prefix to dentate referring to the number of potential coordination atoms present on the ligand. Examples of ligands, or complexing agents, which will form complexes with metal ions include citric acid, EDTA (ethylene-diamine-tetra-acetic acid), and salicylic acid. Metals means the transition metals of the periodic chart in addition to Group IA and IIA metals.

With regard to the biocidal effectiveness of copper, it is theorized that bacteria are destroyed by the reaction of the metal with essential amino acids. In this regard, see Kemmer, F., *The NALCO Water Handbook* (1988). Copper salts, primarily copper sulfate, is added to water supply reservoirs, retention ponds, and canals to control algae growth. As noted above, copper salts are also added to paint as an antifouling agent as described in French, M. S. and L. V. Evans, The effects of copper and zinc on growth of the fouling diatoms Amphora and Amphiprora. *Biofouling*, Vol. 1, No. 1, pp. 3–18, 1988; and Mittelman, M. W. and D. C. White, Biofilm ecology of bioluminescent bacteria. Report, Tennessee University, 1992.

Studies performed by San Diego State University have shown the effectiveness of copper in preventing microbial activities in water sampling devices. See Lewis, D. L., A. P. Simons, W. B. Moore, and D. K. Gattie, Treating soil solution samplers to prevent microbial removal of analytes. *Applied environmental microbiology*, Vol. 58, No. 1, pp. 1–5, 1992. Silver in its ionic form is also often used for disinfection as described in Peavy, H., D. Rowe, and G. Tchobanoglous, *Water Resources and Environmental Engineering*. McGraw-Hill Book Company, New York, 1985; and Pontius, Frederick, *Water Quality and Treatment*. McGraw-Hill Book Company, New York, 1990. Other metallic species such as tin, zinc, and nickel have also been suggested as biocides.

The precipitation of metal species from solution as a result of naturally occurring anions in water supplies is illustrated by Bertine, K. K., and M. F. Mendeck, Industrialization of New Haven, Connecticut, as recorded in reservoir sediments. *Environmental Science & Technology*, Vol. 12, No. 2, pp. 201–207, 1978. Two lakes in Connecticut showed high levels of copper in the form of copper carbonate in the sediments due to excessive usage of copper sulfate. Other species such as sulfate ($SO_4^{2-}$), chloride ($Cl^{1-}$), and nitrate ($NO_3^{1-}$) may also be present in natural water, but their solubility product with respect to copper is relatively higher than that of copper carbonate or copper phosphate and hence are relatively insignificant. However, chloride will react with silver ions to produce silver chloride which is insoluble causing silver to be removed from the solution.

To maintain effective levels of metallic biocides in solution, a suitable complexing agent, or ligand, must be used which (1) effectively shields the metallic ion from anions present in solution (i.e., $CO_3^{2-}$, $SO_4^{2-}$, $NO_3^{1-}$, $Cl^{1-}$, $PO_4^{2+}$) while (2) keeping the metal available for biocidal action. We have discovered that coordination-compound chemistry is the best solution. Complexing agents, or ligands, can be monodentate, bidentate, tridentate, tetradentate, etc. Typical examples are $OH^{1-}$, $NH_3$, $PO_4^{3-}$, $Cl^{1-}$, $-COO^{2-}$ as monodentate ligands; glycinate ($NH_2CH_2COO^-$), oxalate ($^-OOC-COO^-$), salicylate ($^-OC_6H_4COO^-$) as bidentate ligands; citrate ($H_2C-COO-OHCCOO-H_2C-COO$) as a tridentate ligand; and EDTA, ($^-O_2CCH_2)_2-NCH_2CH_2N-(CH_2CO_2^-)_2$ as a hexadentate ligand. Coordination complexes have also naturally developed in biological systems. For example, magnesium is complexed with chlorophyll in plants, and iron is complexed by the porphyrin group of hemoglobin.

We have recognized two important parameters which must be considered when choosing a chelating agent, namely (1) the competition of $H^+$ and other cations with the primary biocidal metal ion for the free pairs of electrons of the coordination atom; and (2) the constant of formation of the metal-ligand complex. In accordance with our invention, the optimum ligand on a chemical basis is selected based on the minimum pH at which the full deprotonated dentate is formed, the number of free pairs of electrons per ligand, and the constant of formation of the ligand with the desired metal ions versus other cations (e.g., $Ca^{2+}$, $Fe^{2+}$) present in natural water. Another heavily weighted factor in the overall feasibility determination of the final complex formulation will include the human health effect. Copper, silver, nickel, and zinc are regulated by the Environmental Protection Agency, and the water quality standards are 1.0, 0.05, 0.10, and 5.0 mg/L, respectively. The disinfection processes and biocide solutions of the present invention described herein by example meet current EPA requirements for potable drinking water.

It is, therefore, an object of the present invention to substantially improve disinfectant technology by using premixed solutions of metal-ligand complexes as a stable disinfectant for water containing calcium, iron, carbonates, chlorides, nitrates, and sulfates. Although complexing agents such as ETDA have been used for cleaning applications and food preservation, and complexed metals have been used as biofouling additives for paint and coatings, the use of metal-ligand complexes as an additive for water disinfection and subsequent use for consumption or cleaning has not been recognized.

It is another object of the present invention to provide a method which has both military and commercial sector applications, such as remote field use or camping water supply, third world country assistance, and domestic and foreign disaster relief efforts.

It is still a further object of the present invention to provide a water disinfecting method which can be scaled up for use in municipal water treatment facilities and also in countries with scarce and/or unsafe drinking water.

These and other objects have been achieved by use of non-toxic complexing agents that bind to the metallic ions, providing a "shield" from reactive anions while retaining the metal's biocidal capacity to kill pathogenic bacteria and microorganisms.

BRIEF DESCRIPTION OF THE DRAWINGS

These and other objects, advantages and features of the present invention will become more readily apparent from the following detailed description of a presently preferred mode for carrying out the invention when taken in conjunction with the drawings wherein.

DETAILED DESCRIPTION OF THE DRAWINGS

Figure 1:
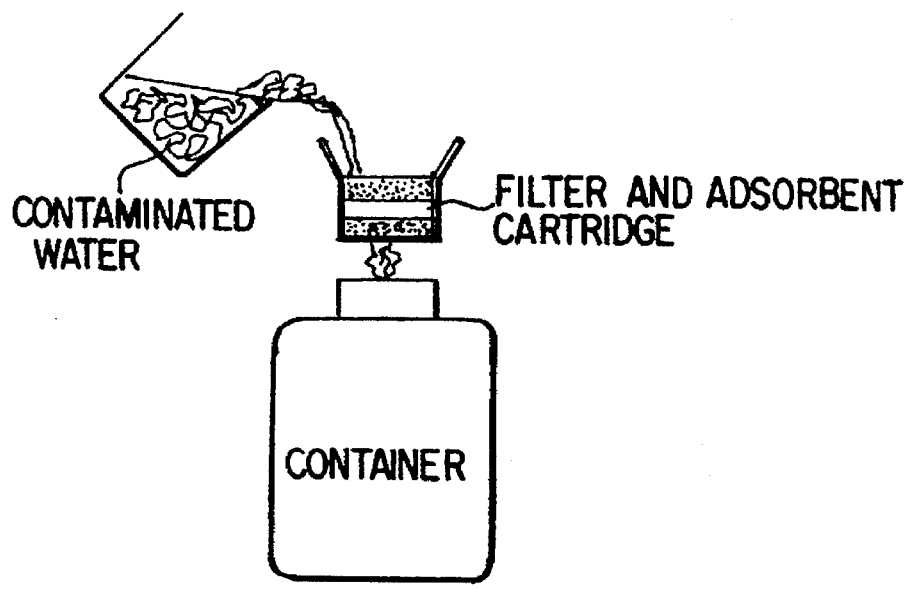
FIG. 1 is a schematic depiction of the method of disinfecting contaminated water in a container.

We currently contemplate that a preferred mode for carrying out our invention is a method by which a solution of the metal-ligand complex is added to a vessel with bacteria-containing water. The metal-ligand solution will have been previously prepared with one preparation technique described in the Examples below. The resulting liquid solution of the bacteria-containing water and metal-ligand biocide will then be shaken to mix the components. Since bacteria, such as *E. coli, Vibrio cholera, Fecal streptococci, Bacillus subtilis, Enterobacter coliform,* Actinomycetes, *Pseudomonas aeruginosa,* and *Salmonella typhosa,* will adsorb on solid particulates, the disinfection process through the action of the metal-ligand biocide complex will be enhanced if a particulate filter and absorbent cartridge is used as seen in FIG. 1.

Figure 2:
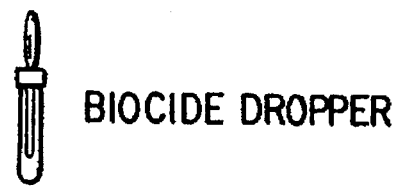
FIG. 2 is a schematic drawing of a biocide dropper for adding the biocide of the present invention to the container in FIG. 1.

With specific reference to the drawings, the metal-ligand biocide complex disinfection process is implemented by pouring a capsule or solution vial of biocide or dropping, via the dropper of FIG. 2, the biocide solution into a personal water supply container such as a canteen, containing prefiltered water. The disinfected/purified water can then be used for drinking or cleaning because of the known biocidal actions of metallic ions, such as $Cu^{2+}$, $Zn^{2+}$, $Ni^{2+}$ and $Ag^{1+}$, and the complexation of these species with complexing agents which stabilize the metal in the presence of abundant ionic species such as carbonate, iron, phosphate, and calcium.

Figure 3:
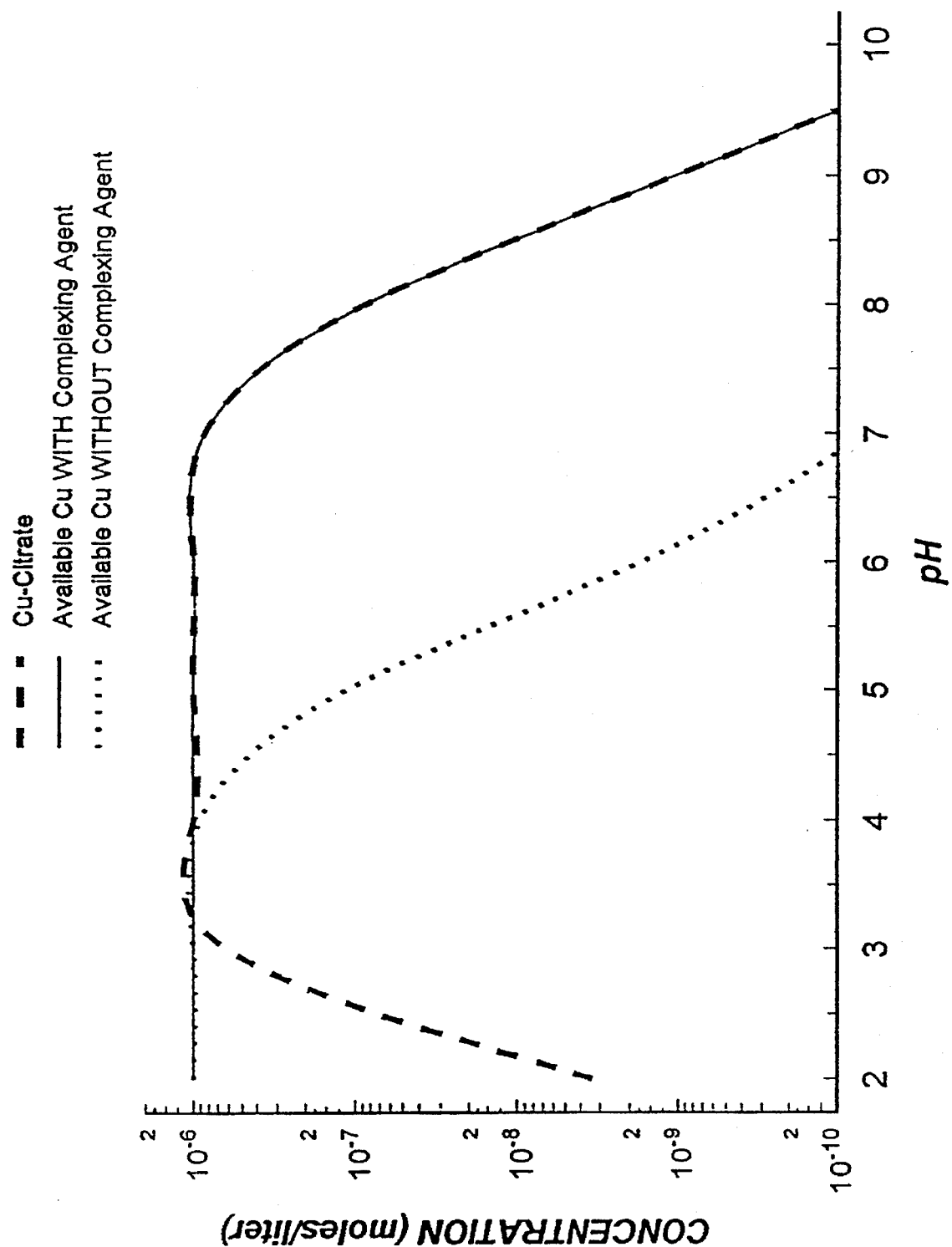
FIG. 3 is a graph of the available copper over a range of pH's for solutions containing copper and complexing agent citrate, and solutions containing only copper.

FIG. 3 summarizes the net effect of complexing agent on the "available" Cu in solution. Anions and cations in solution will either bind with or precipitate the metal, the latter causing a decrease in the available copper for biocidal action. The complexing agent citrate prevents the loss of available copper at pH's above about 4 as illustrated by FIG. 3. The availability of free copper, or other biocidal metals at natural water pH's is essential for an effective biocidal treatment solution.

EXAMPLE #1

This example presents a synopsis of biocidal solution design calculations for a biocidal solution comprised of citric acid (the ligand, or complexing agent) and copper. One gallon of natural water containing bacteria such as *E. coli, Vibrio cholera, Fecal streptococci, Bacillus subtilis, Enterobacter coliform,* Actinomycetes, or *Salmonella typhosa* can be treated with one drop of stock solution prepared as follows. For this example, a biocide solution of copper sulfate and citric acid is prepared. Other chemical species present in natural water are carbonate, sulfate, nitrate, chloride, and phosphate, all of which have the potential for decreasing copper effectiveness via precipitation of copper (carbonate, and phosphate), or increasing copper complexation thereby increasing the total available copper.

Figure 4:
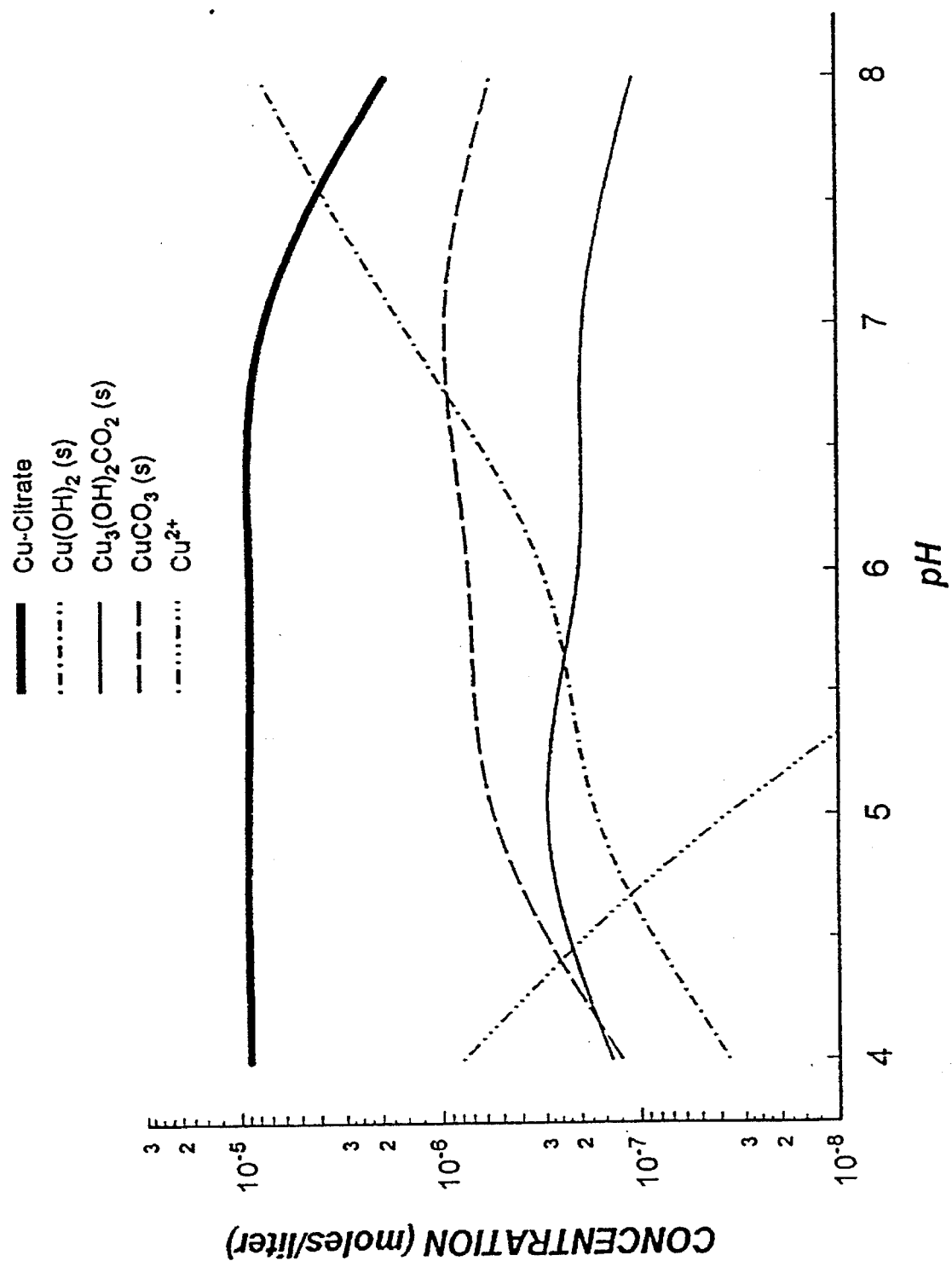
FIG. 4 is a graph of the speciation of a biocide solution containing copper and citric acid, in the presence of carbonate and hydroxyl ions.

The stock biocidal solution is prepared by dissolving 189 grams of copper sulfate ($CuSO_4 \cdot 5H_2O$) and 130.9 grams of citric acid in one liter of de-ionized distilled water. The resulting solution chemistry, after the addition of one drop of the stock solution to one gallon of the infected water is described in FIG. 4. The chemical reactions involved are presented below:

$$Cu_3(OH)_2(CO_3)_2(s) + 4H^+ \underset{}{\overset{K = 1.0E+21.24}{\rightleftharpoons}} 3Cu^{2+} + 4H_2O + 2CO_2 \quad (1)$$

$$Cu^{2+} + H_2O \underset{}{\overset{K = 1.0E-8}{\rightleftharpoons}} CuOH^+ \quad (2)$$

$$Cu(OH)_2(s) \underset{}{\overset{K = 2.2E-20}{\rightleftharpoons}} Cu^{2+} + 2OH^- \quad (3)$$

$$Cu^{2+} + 3H_2O \underset{}{\overset{K = 1.0E-26.3}{\rightleftharpoons}} Cu(OH)_3^- + 3H^+ \quad (4)$$

$$Cu^{2+} + 4H_2O \underset{}{\overset{K = 1.0E-39.4}{\rightleftharpoons}} Cu(OH)_4^{2-} + 4H^+ \quad (5)$$

$$CuCO_3(s) \underset{}{\overset{K = 1.4E-10}{\rightleftharpoons}} Cu^{2+} + CO_3^{2-} \quad (6)$$

$$Cu^{2+} + CO_3^{2-} \underset{}{\overset{K = 1.0E+6.77}{\rightleftharpoons}} CuCO_3(aq) \quad (7)$$

$$Cu^{2+} + 2CO_3^{2-} \underset{}{\overset{K = 1.0E+10.01}{\rightleftharpoons}} Cu(CO_3)_2^{2-}(aq) \quad (8)$$

COMPLEXATION OF COPPER WITH CITRATE:

$$Cu^{2+} + Cit^{3-} \underset{}{\overset{K = 1.58E+11}{\rightleftharpoons}} CuCit^- \quad (9)$$

Based on the thermodynamic equilibrium constants of equations 1 through 9, only a few possible species will be competing with citrate for the copper in solution. Species which are present in concentrations of 3 orders of magnitude or smaller relative to the complexed copper citrate are not shown in FIG. 4, since these species will not appreciably affect the available copper in solution.

The stock solution is used to disinfect water by applying a pre-determined amount to the natural water. In this example, one drop (0.05 ml) stock solution will produce 1.0E-05 moles/L total copper. This concentration is equivalent to 0.6354 ppm which is less than the MCL for drinking water of 1.0 ppm for copper. Assuming a water supply with a pH of 5.0, the amount of copper that is complexed with the citrate (available for disinfection) will be 89.6%. This is given by chemical Eqn. 8 and shown in FIG. 4.

EXAMPLE #2

This example presents a synopsis of biocidal solution design calculations for a biocidal solution comprised of ethylenediamine-N-N-N'-N'-tetraacetic acid disodium salt and zinc. One gallon of natural water containing bacteria can be treated with nine drops of stock solution prepared as follows. For this example, a biocide solution of zinc sulfate and EDTA is prepared. Other chemical species present in natural water are carbonate, sulfate, nitrate, chloride, and phosphate, all of which have the potential for decreasing copper effectiveness via precipitation of zinc (carbonate, and phosphate), or increasing zinc complexation thereby increasing the total available zinc.

Figure 5:
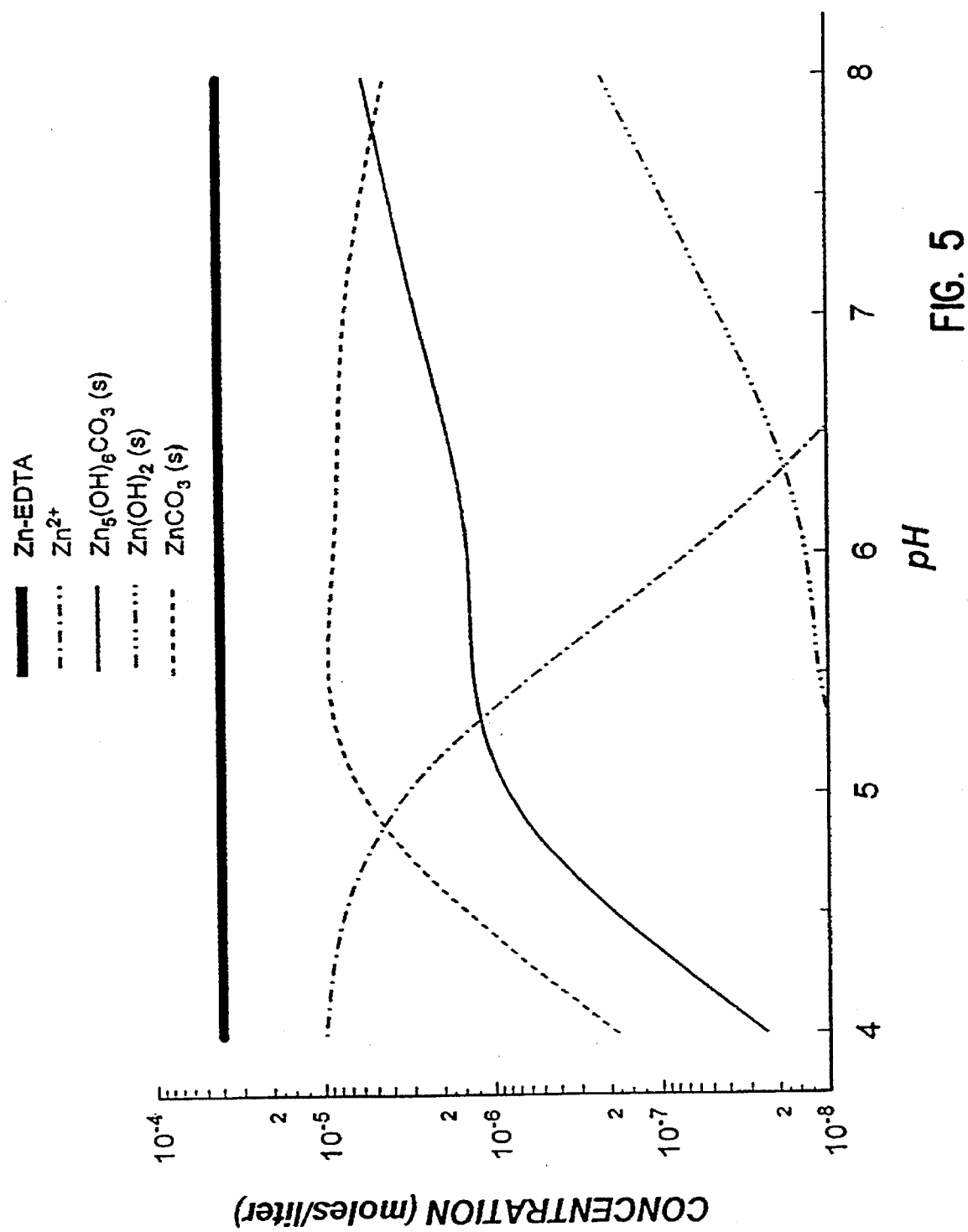
FIG. 5 is a graph of the speciation of a biocide solution containing zinc and EDTA, in the presence of carbonate and hydroxyl ions.

The stock biocidal solution is prepared by dissolving 120 grams of zinc sulfate ($ZnSO_4 \cdot 7H_2O$) and 110 grams of EDTA disodium salt in one liter of de-ionized distilled water. The resulting solution chemistry, after the addition of nine drops of the stock solution to one gallon of the infected water is described in FIG. 5. The chemical reactions involved are presented below:

$$Zn(OH)_{1.2}(CO_3)_{0.4}(s) + 2H^+ \underset{}{\overset{K = 2.51E9}{\rightleftharpoons}} Zn^{2+} + 1.2H_2O + 0.4H_2CO_3 \quad (10)$$

$$Zn^{2+} + H_2O \underset{}{\overset{K = 3.98E-10}{\rightleftharpoons}} ZnOH^+ + H^+ \quad (11)$$

$$Zn(OH)_2(s) + 2H^+ \underset{}{\overset{K = 5.01E+12}{\rightleftharpoons}} Zn^{2+} + 2H_2O \quad (12)$$

$$Zn^{2+} + 3H_2O \underset{}{\overset{K = 6.31E-29}{\rightleftharpoons}} Zn(OH)_3^- + 3H^+ \quad (13)$$

$$Zn^{2+} + 4H_2O \underset{}{\overset{K = 3.16E-41}{\rightleftharpoons}} Zn(OH)_4^{2-} + 4H^+ \quad (14)$$

$$CuCO_3(s) + 2H^+ \underset{}{\overset{K = 5.01E6}{\rightleftharpoons}} Zn^{2+} + H_2CO_3 \quad (15)$$

$$ZnO + 2H^+ \underset{}{\overset{K = 2.51E11}{\rightleftharpoons}} Zn^{2+} + H_2O \quad (16)$$

COMPLEXATION OF ZINC WITH EDTA $$Zn^{2+} + EDTA^{4-} \underset{}{\overset{K = 2.5E16}{\rightleftharpoons}} ZnEDTA^{2-} \quad (17)$$

Based on the thermodynamic equilibrium constants of equations 10 through 17, only a few possible species will be competing with EDTA for the zinc in solution. Species which are present in concentrations of 4 orders of magnitude or smaller relative to the complexed zinc-EDTA are not shown in FIG. 5, since these species will not appreciably affect the available zinc in solution.

The stock solution is used to disinfect water by applying a pre-determined amount to the natural water. In this example, nine drops (0.45 ml) stock solution will produce 5.0×10⁻⁵ moles/L total zinc. This concentration is equivalent to 3.27 ppm which less than the MCL for drinking water of 5.0 ppm for zinc.

Assuming the water pH to be 6.0, then the amount of zinc that is complexed with EDTA (available for disinfection) is 79.99%. This is given by chemical Eqn. 17 and shown in FIG. 5.

EXAMPLE #3

This example presents a synopsis of biocidal solution design calculations for a biocidal solution comprised of citric acid (the ligand, or complexing agent) copper, and zinc. One gallon of natural water containing bacteria could be treated with two drops of stock solution prepared as follows. For this example, a biocide solution of copper/zinc sulfate and citric acid is prepared. Other chemical species present in natural water are carbonate, sulfate, nitrate, chloride, and phosphate, all of which have the potential for decreasing copper effectiveness via precipitation of zinc and/or copper (carbonate, and phosphate), or increasing copper and zinc complexation thereby increasing the total available zinc and copper.

Figure 6:
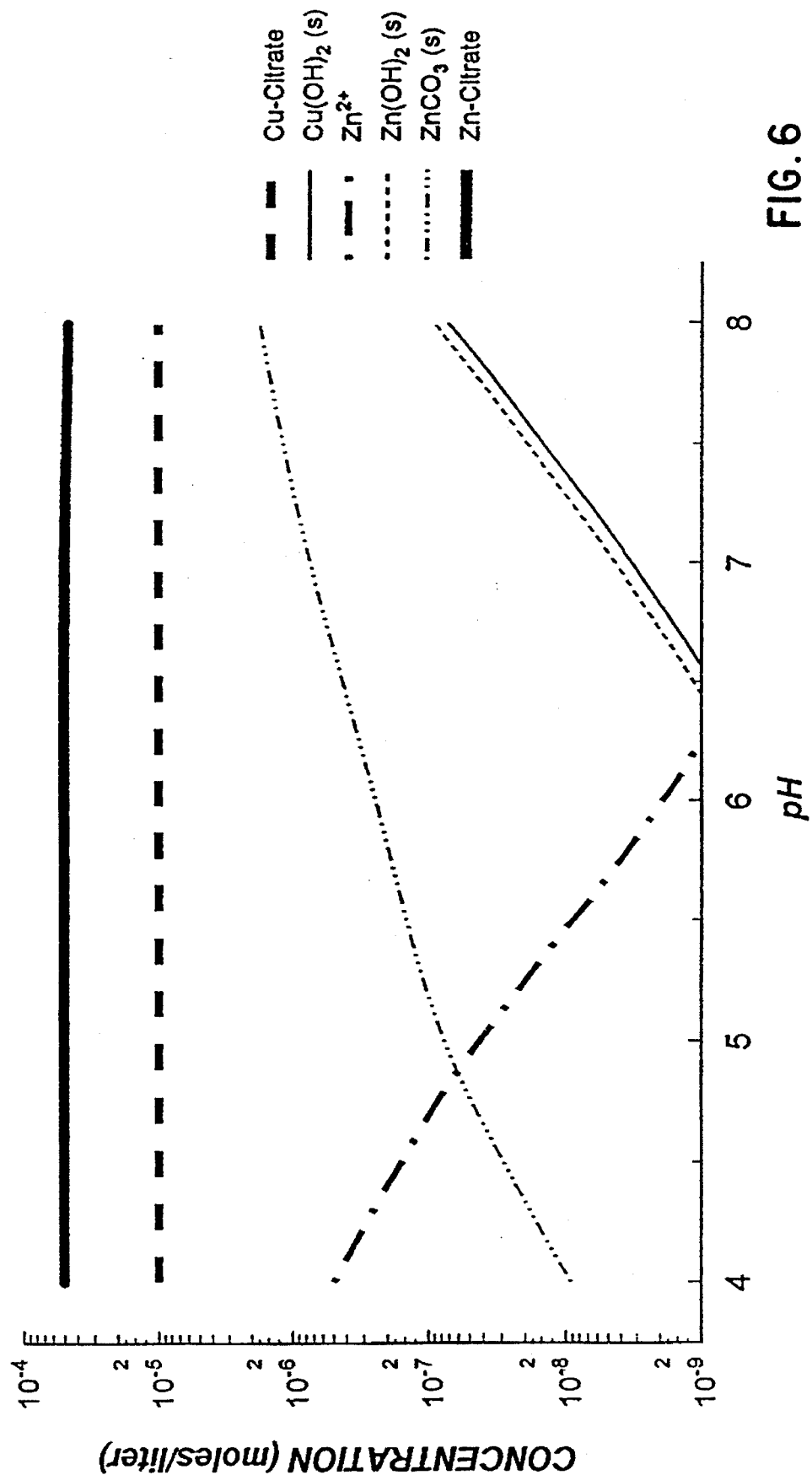
FIG. 6 is a graph of the speciation of a biocide solution containing copper, zinc and citric acid, in the presence of carbonate and hydroxyl ions.

The stock biocidal solution is prepared by dissolving 95 grams of copper sulfate ($CuSO_4 \cdot 5H_2O$), 545 grams of zinc sulfate ($ZnSO_4 \cdot 7H_2O$) and 436 grams of citric acid in one liter of de-ionized distilled water. The resulting solution chemistry, after the addition of two drops of the stock solution to one gallon of the infected water is described in FIG. 6. The chemical reactions involved are presented by Eqns. 1–16 and Eqn. 18:

COMPLEXATION OF ZINC WITH CITRATE:

$$Zn^{2+} + Cit^{3-} \xrightleftharpoons{K = 1.58E+14} ZnCit^{-} \quad (18)$$

Based on the thermodynamic equilibrium constants of equations 1 through 16 and 18, only a few possible species will be competing with citrate for the zinc and copper in solution. Species which are present in concentrations of 5 orders of magnitude or smaller relative to the complexed zinc and copper citrate are not shown in FIG. 6, since these species will not appreciably affect the available zinc and copper in solution.

The stock solution is used to disinfect water by applying a pre-determined amount to the natural water. In this example, two drops (0.10 ml) stock solution will produce $1.0 \times 10^{-5}$ moles/L of total copper and $5.0 \times 10^{-5}$ moles/L of total zinc. These concentrations are equivalent to 0.6354 ppm and 3.269 respectively which are less than the MCL for drinking water of 1.0 ppm for copper and 5 ppm for zinc.

Assuming the water pH to be 7.0, then the amount of copper that complexed with citrate (available for disinfection) is 99.99% and the amount of zinc that is complexed with citrate (available for disinfection) is 83.1%. This is given by chemical Eqns. 9 and 18, and shown in FIG. 6.

EXAMPLE #4

This example presents a synopsis of biocidal solution design calculations for a biocidal solution comprised of ethylenediamine-N-N-N'-N'-tetraacetic acid disodium salt, salicylic acid sodium salt and nickel. This formula could be applied to disinfect one gallon of naturally occurring water containing certain bacterial contaminants. For this example, a biocide solution of nickel sulfate, EDTA, and salicylic acid sodium salt is prepared. Other chemical species present in natural water are carbonate, sulfate, nitrate, chloride, and phosphate, all of which have the potential for decreasing nickel effectiveness via precipitation of nickel (carbonate, and phosphate), or increasing nickel complexation thereby increasing the total available nickel.

Figure 7:
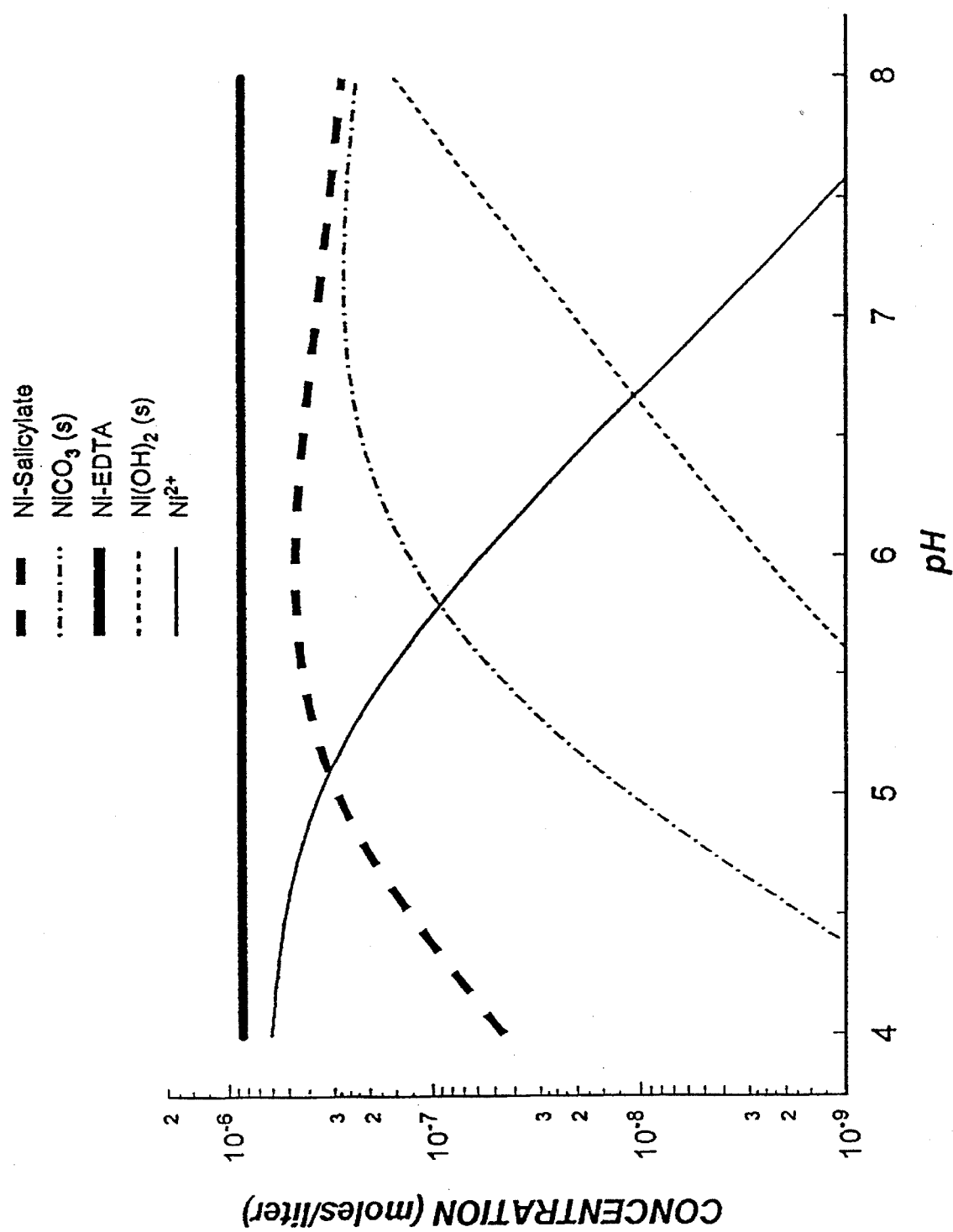
FIG. 7 is a graph of the speciation of a biocide solution containing nickel, sodium salicylate, and EDTA, in the presence of carbonate and hydroxyl ions.

The stock biocidal solution is prepared by dissolving 29.9 grams of nickel sulfate ($NiSO_4 \cdot 6H_2O$), 21.6 grams of EDTA disodium salt, and 424.3 grams of salicylic acid sodium salt in one liter of de-ionized distilled water. The resulting solution chemistry, after the addition of one drop of the stock solution to one gallon of the infected water is described in FIG. 7. The chemical reactions involved are presented below:

$$Ni^{2+} + OH^- \xrightleftharpoons{K = 93.3E-3} NiOH^+ \quad (19)$$

$$Ni^{2+} + 2OH^- \xrightleftharpoons{K = 2.818E-9} NiOH^+ \quad (20)$$

$$Ni^{2+} + 3OH^- \xrightleftharpoons{K = 4.67E-12} Ni(OH)_3^- \quad (21)$$

$$Ni(OH)_2(s) \xrightleftharpoons{K = 2.2E-15} Ni^{2+} + 2OH^- \quad (22)$$

$$NiCO_3(s) \xrightleftharpoons{K = 6.60E-9} Ni^{2+} + CO_3^{2-} \quad (23)$$

COMPLEXATION OF NICKEL WITH EDTA:

$$Ni^{2+} + EDTA^{4-} \xrightleftharpoons{K = 3.63E18} NiEDTA^{2-} \quad (24)$$

COMPLEXATION OF NICKEL WITH SALICYLIC ACID:

$$Ni^{2+} + Sal^{2-} \xrightleftharpoons{K = 5.62E11} NiSal \quad (25)$$

Based on the thermodynamic equilibrium constants of equations 19 through 25, only a few possible species will be competing with EDTA and salicylate for the nickel in solution. Species which are present in concentrations of 3 orders of magnitude or smaller relative to the complexed nickel salicylate and nickel-EDTA are not shown in FIG. 7, since these species will not appreciably affect the available nickel in solution.

The stock solution is used to disinfect water by applying a pre-determined amount to the natural water. In this example, one drop (0.05 ml) stock solution will produce $1.5 \times 10^{-6}$ moles/Liter total nickel. This concentration is equivalent to 0.255 ppm which less than the MCL for drinking water of 0.1 ppm for nickel.

Assuming the water pH to be 6.0, then the amount of nickel that is complexed with both EDTA and salicylic acid (available for disinfection) is 87.4%. This is given by chemical Eqns. 24 and 25, and shown in FIG. 7.

EXAMPLE #5

This example presents a synopsis of biocidal solution design calculations for a biocidal solution comprised of citric acid (the ligand, or complexing agent) and copper. One gallon of sewage effluent containing bacteria could be treated with one drop of stock solution prepared as follows. For this example, a biocide solution of copper sulfate and citric acid is prepared. Other chemical species present in sewage effluent are carbonate, sulfate, chloride, nitrate and especially phosphate, all of which have the potential for decreasing copper effectiveness via precipitation of copper (carbonate, and phosphate), or increasing copper complexation thereby increasing the total available copper.

Figure 8:
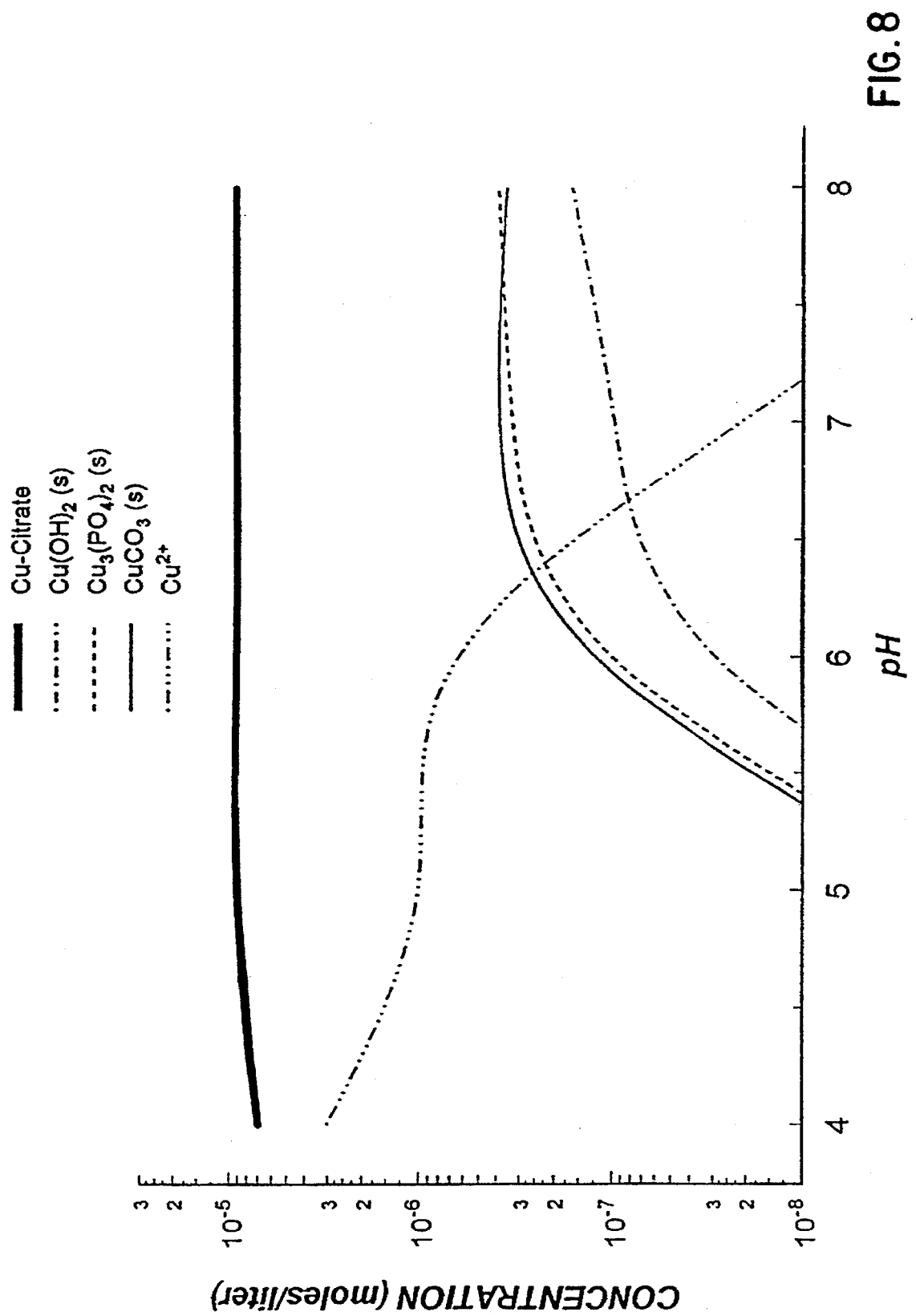
FIG. 8 is a graph of the speciation of a biocide solution containing copper and citric acid, in the presence of carbonate, phosphate, and hydroxyl ions.

The stock biocidal solution is prepared by dissolving 189 grams of copper sulfate ($CuSO_4 \cdot 5H_2O$) and 130.9 grams of citric acid in one liter of de-ionized distilled water. The resulting solution chemistry, after the addition one drop of the stock solution to one gallon of the sewage effluent is described in FIG. 8. The chemical reactions involved are presented by Eqns 1–9 and 26:

CHEMICAL REACTION OF COPPER WITH PHOSPHATE $$Cu_3(PO_4)_2 \xrightleftharpoons{K = 1.30E-37} 3Cu^{2+} + 2PO_4^{3-} \quad (26)$$

Based on the thermodynamic equilibrium constants of equations 1 through 9 and 26, only a few possible species will competing with citrate for copper in solution. Species which are present in concentration 3 order of magnitude or smaller relative to the complexed copper citrate are not shown in FIG. 8.

The stock solution is used to disinfect water by applying a pre-determined amount to the sewage effluent. In this example, one drop (0.05 ml) stock solution will produce $1.0 \times 10^{-5}$ moles/L total copper. This concentration is equivalent to 0.6354 ppm which is less than the MCL for drinking water of 1.0 ppm for copper.

Assuming the water pH to be 5.0, then the amount of copper that is complexed with the citrate (available for disinfection) is 89.3%. This is given in chemical Eqn 9, and shown in FIG. 7. Therefore, even when phosphate ions are present above naturally-occurring concentrations as in sewage effluent, the complexation reaction predominates over the formation of copper phosphate precipitate (Eqn. 26). From Example 1, the complexed copper at pH 5.0 was 89.6%, compared to 89.3% in presence of phosphate.

EXAMPLE #6

Figure 9:
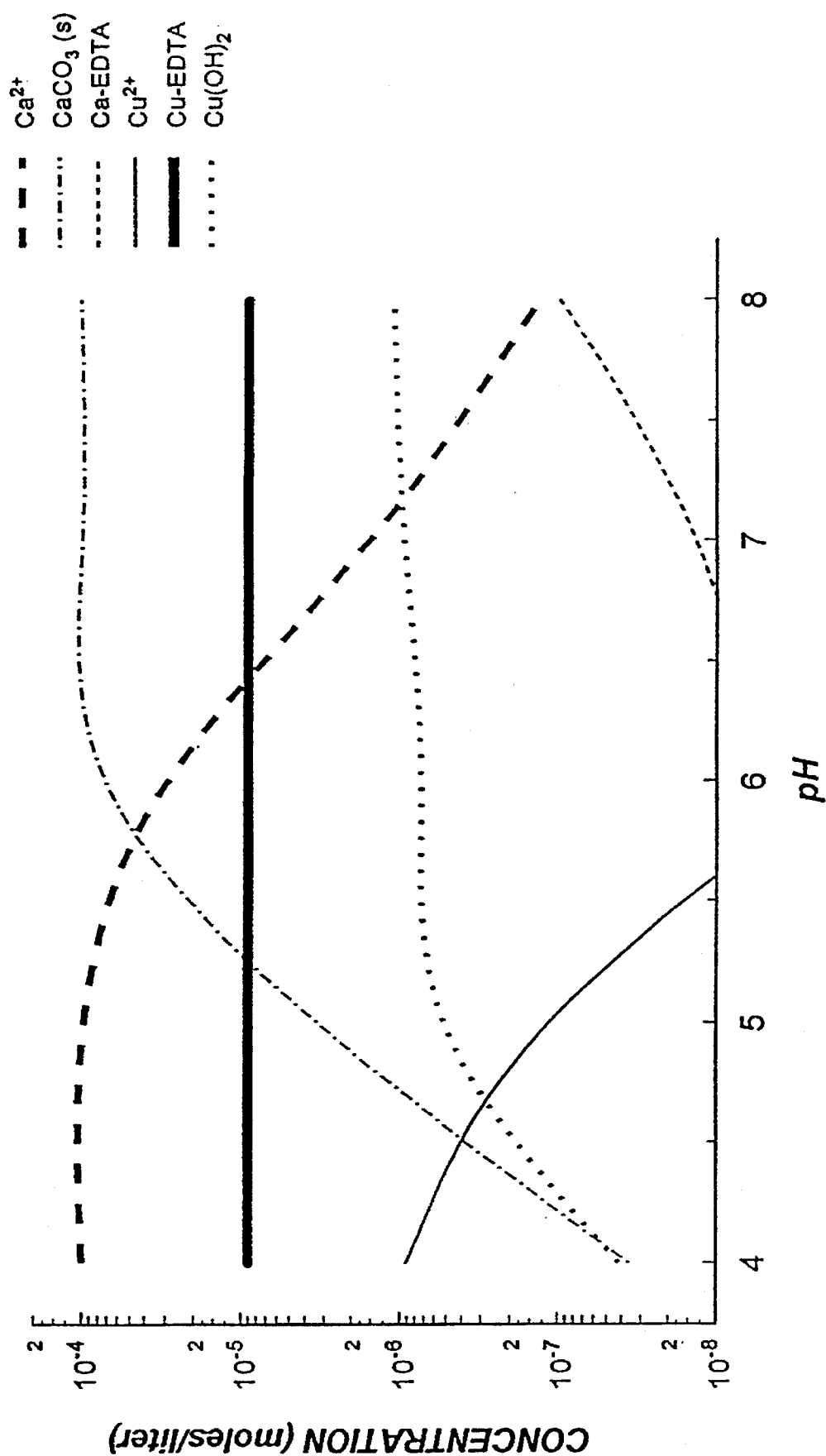
FIG. 9 is a graph of the speciation of a biocide solution containing copper and EDTA, in the presence of calcium.

This example illustrates the effect of calcium on the complexation of copper with EDTA. The average calcium concentration in natural water is about $10^{-4}$ moles/liter, and the equilibrium constant of the calcium/EDTA complexation reaction is $10^{11}$, which is about 9 times order of magnitude smaller than that of copper and EDTA ($10^{18.7}$.) Therefore, the competition of calcium with copper for EDTA is negligible, especially in the pH range of interest, 4.5 to 7.5. This example shows that in the presence of copper, the predominant calcium species is calcium carbonate while the EDTA complexed calcium is very small when compared to that of copper (see FIG. 9). Note that calcium does not complex with citrate, and therefore presents no interference for this complexing agent with metals such as copper and nickel.

EXAMPLE #7

This example illustrates the effect of iron on the complexation of copper with citric acid/citrate. The average iron concentration in natural water is about $4\times10^{-6}$ moles/liter. However, depending on the water chemistry, especially surface versus ground (or well) water, the iron can be present as $Fe^{3+}$ or $Fe^{2+}$. In general, ground or well water is anaerobic and iron is reduced from $Fe^{3+}$ to $Fe^{2+}$. While for surface water, where oxygen is available between 3 to 8 mg/liter, iron is oxidized to $Fe^{3+}$. In addition, the presence of organic matter such as humic substances may complex with iron in addition to the biocidal metal, resulting in more available biocide metal. However, in this example, both $Fe^{3+}$ and $Fe^{2+}$ will be considered without the presence of any organic matter that might complex iron and copper. This assumption is justified by the fact the effect of organic matter provides for more available metal (copper or iron) which is the purpose of this invention.

Figure 10:
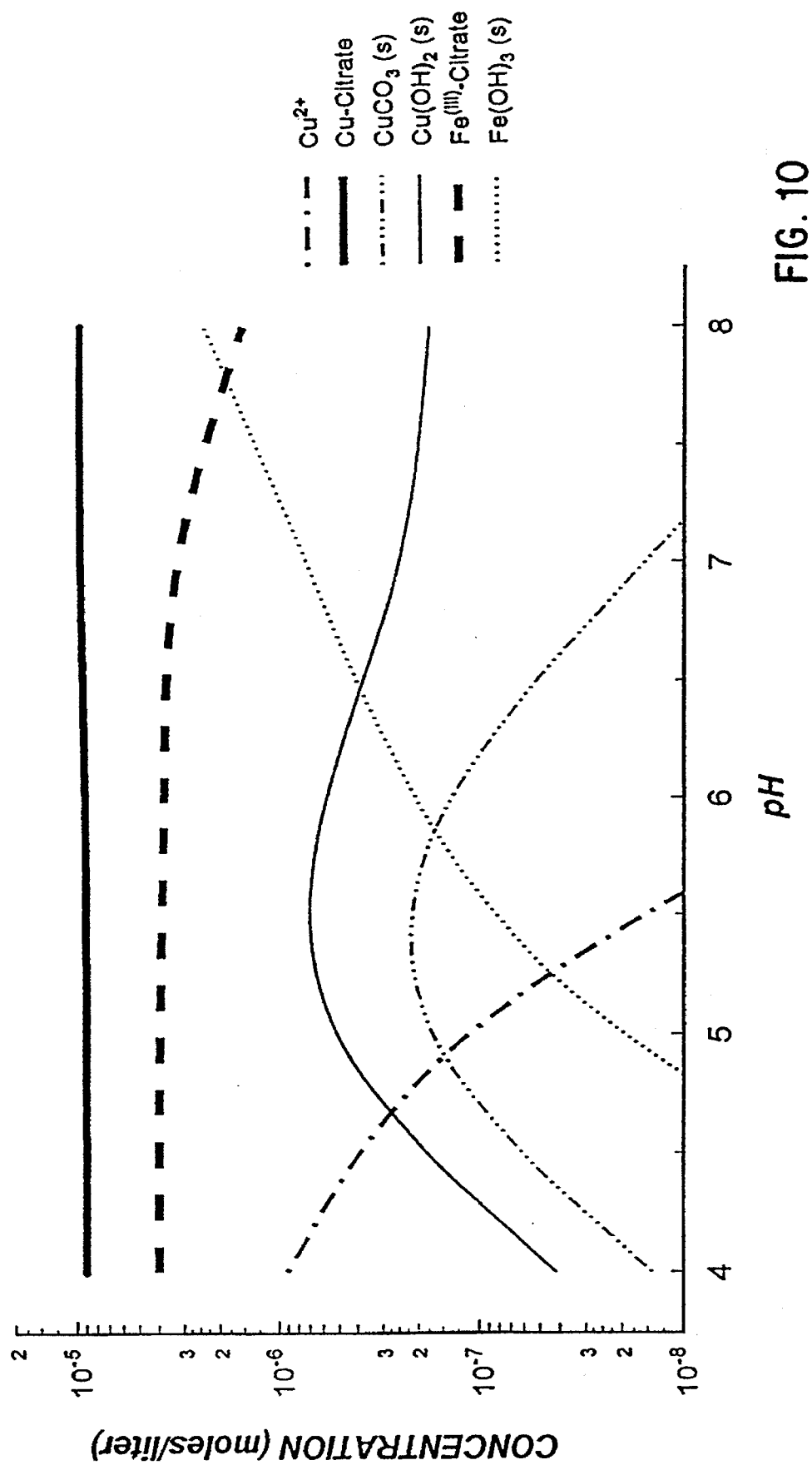
FIG. 10 is a graph of the speciation of a biocide solution containing copper and citric acid, in the presence of iron (III).

First, the oxidized iron will be considered $Fe^{3+}$. The equilibrium constant of the $Fe^{3+}/Cit^{3-}$ complexation reaction is $10^{25}$, which is about 10 times order of magnitude larger than that of copper and $Cit^{3-}$ ($10^{14.2}$.) Therefore, iron will be totally complexed before any of the copper reacts with the citrate ions. With a copper concentration of $10^{-5}$ moles/liter (note that concentrations of up to $1.5\times10^{-5}$ are permissible by current EPA MCL drinking water standards), an iron concentration of $4\times10^{-6}$ moles/liter, and $1.3\times10^{-5}$ moles/liter of citric acid, the amount of complexed copper is about 90%, while the complexed iron is about 95% (see FIG. 10) over the pH range 4.5 to 7.5.

Figure 11:
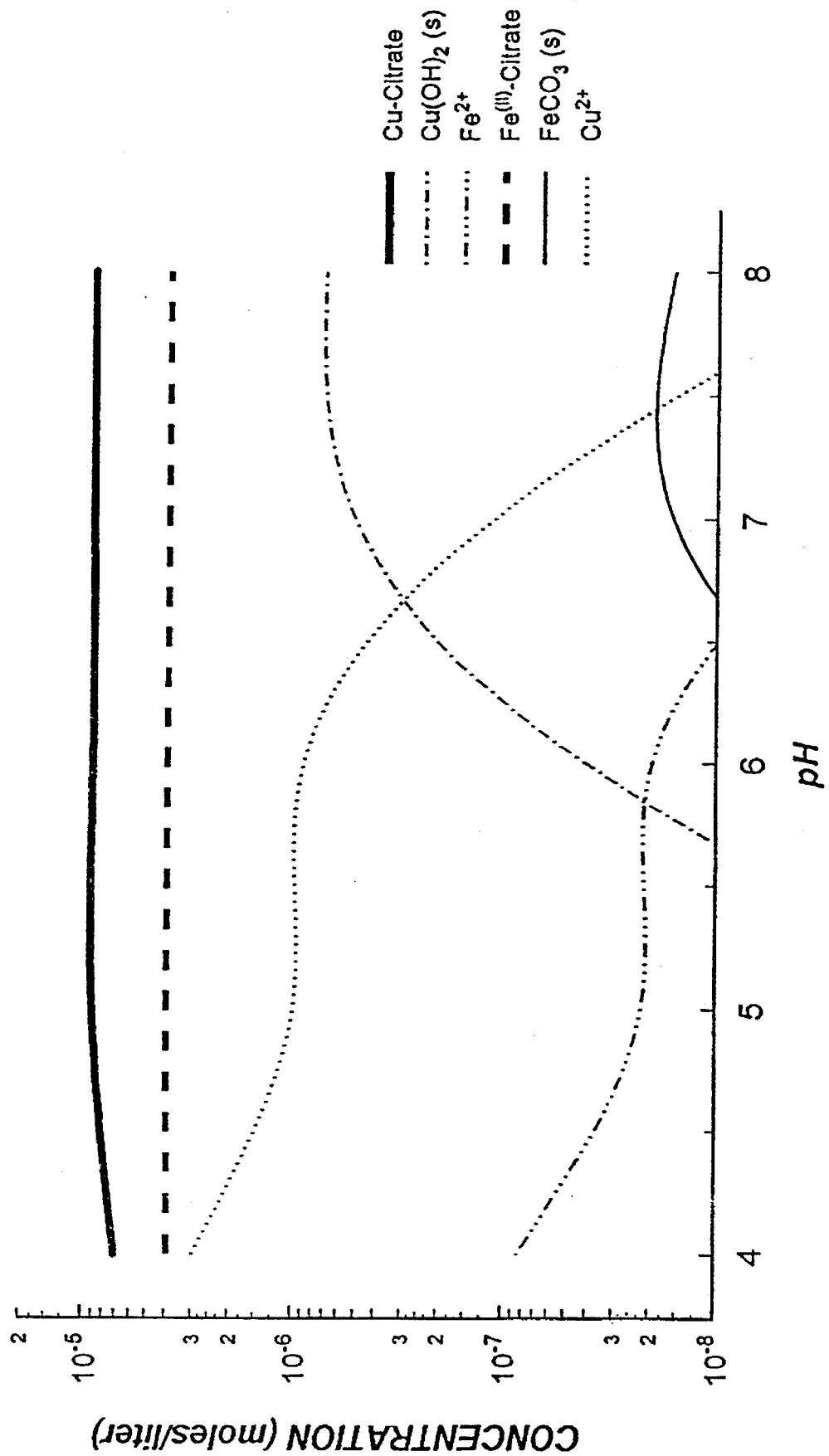
FIG. 11 is a graph of the speciation of a biocide solution containing copper and citric acid, in the presence of iron (II).

The effect of reduced iron $Fe^{2+}$, prominent is most ground water supplies, must also be considered. The equilibrium constant of the $Fe^{2+}/Cit^{3-}$ complexation reaction is $10^{15.5}$ which is about 1 time order of magnitude larger than that of copper and $Cit^{3-}$ ($10^{14.2}$.) Therefore, the iron will be totally complexed before any of the copper reacts with the citrate ions. With a copper concentration of $10^{-5}$ moles/L, an iron concentration of $4\times10^{-6}$ moles/liter, and $1.3\times10^{-5}$ moles/L of citric acid, the amount of complexed copper is about 90%, while the complexed iron is about 99% (see FIG. 11) over the pH range 4.5 to 7.5.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for disinfecting contaminated natural water, comprising the steps of formulating a solution comprising at least one biocide metal bound to at least one complexing agent taking into account competition between other known cations and anions in the contaminated natural water and the at least one biocide metal, adding the solution to the contaminated natural water such that the at least one biocide metal remains in solution, and obtaining potable water from the contaminated natural water to which the solution has been added.

2. The method according to claim 1, wherein the solution has a concentration of biocide metal such that no more than ten 0.05 ml drops of the solution treats one gallon of water.

3. The method according to claim 1, wherein the solution is formulated for a contaminated natural water at a pH of 4.5 to 8.5.

4. The method according to claim 1, wherein ions present in the water are selected from the group consisting of at least one of carbonates, sulfate, chloride, phosphate, an alkali metal, an alkaline metal, and a transition metal.

5. The method according to claim 1, wherein the solution is a combination of two or more metals along with two or more complexing agents.

6. The method according to claim 1, wherein the complexing agent is selected using at least one of a minimum pH at which full deprotonated dentate is formed, the number of free pairs of electrons of the chelating agent, and a thermodynamic constant of formation of the complexing agent with metal ions in relation to cations present in the water.

7. The method according to claim 1, wherein the complexing agent is derived from at least one of the complexing agent acid or salt of the complexing agent acid.

8. The method according to claim 1, wherein the biocide metal is supplied via a soluble salt.

* * * * *